June 2, 1931.                L. L. DRIGGS, JR., ET AL                1,808,640
PHOTOGRAPHIC FLASH LIGHT DEVICE
Filed Nov. 12, 1929          2 Sheets-Sheet 2
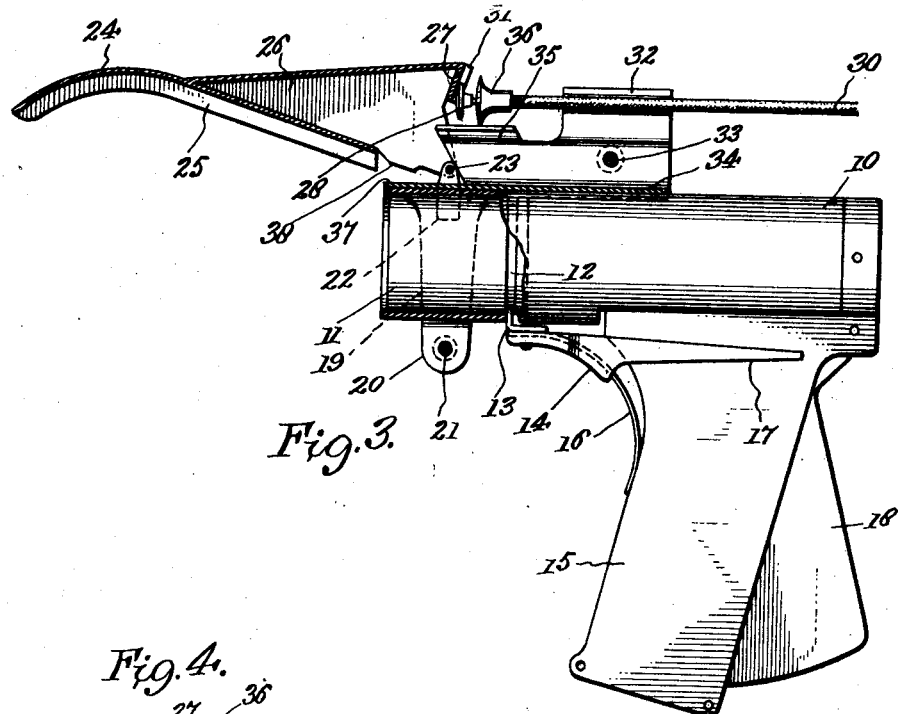
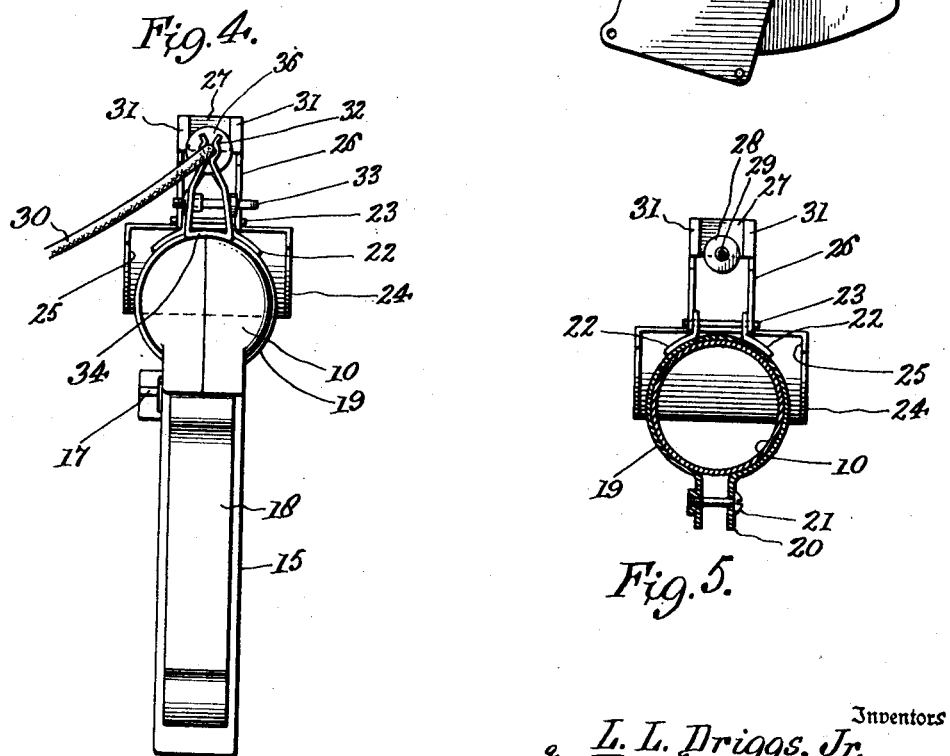

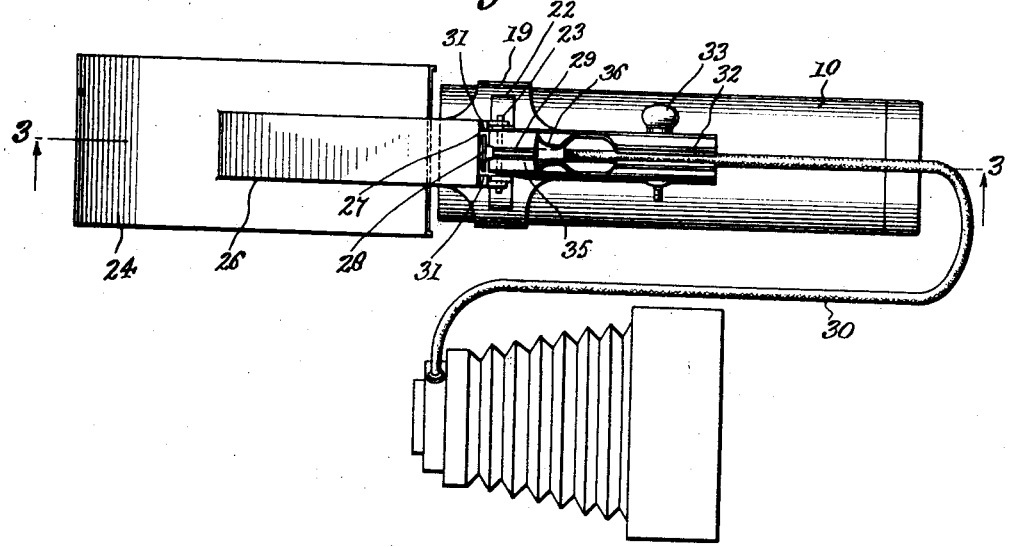
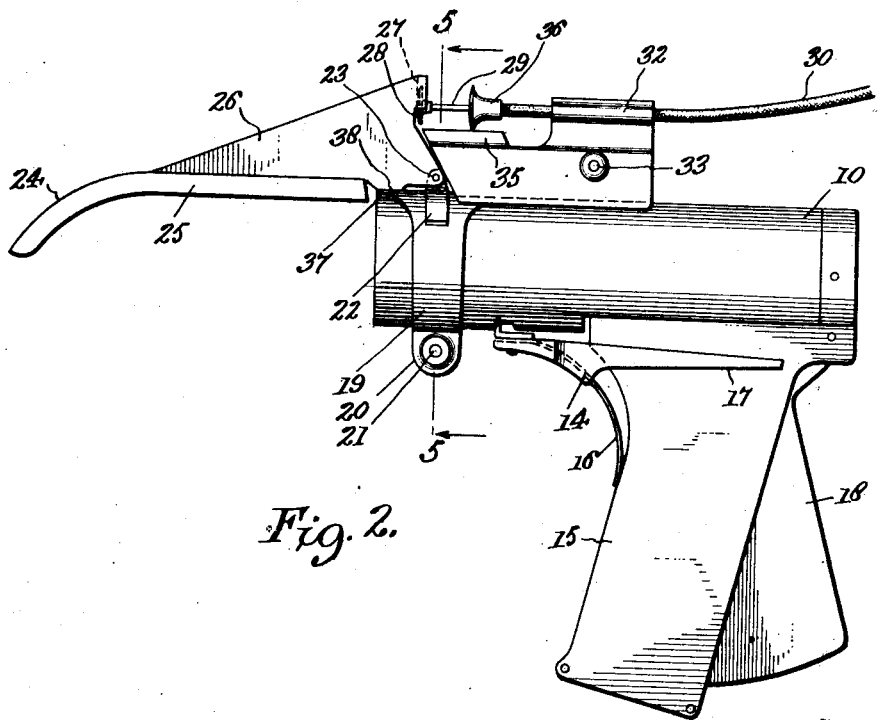

Patented June 2, 1931

1,808,640

UNITED STATES PATENT OFFICE

LOUIS L. DRIGGS, JR., OF NEW ROCHELLE, AND HENRY B. FABER, OF NEW YORK, N. Y.

PHOTOGRAPHIC FLASH LIGHT DEVICE

Application filed November 12, 1929. Serial No. 407,072.

The present invention relates to improvements in photographic flashlight devices, and has for an object to provide an improved device for simultaneously firing the flashlight and tripping the camera shutter.

Another object of the invention is to secure synchronism in the operation of the camera shutter with the flash by the use of a positively operating mechanism that is faithful in its operation.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a top plan view of an improved photographic flashlight device constructed in accordance with the present invention and shown coupled to a camera, Figure 2 is a side view of the improved device in the initial position, Figure 3 is a longitudinal section taken on the line 3—3 in Figure 1, with the device in the shutter operating position.

Figure 4 is a rear view of the device, and

Figure 5 is a cross section taken on the line 5—5 in Figure 2.

Referring more particularly to the drawings, 10 designates the barrel of a pistol used in firing the flashlight cartridge 11, which is placed within the muzzle of the barrel, as indicated in Figure 3. This flashlight cartridge may be constructed as shown more particularly in our copending application, Ser. No. 331,128, filed January 8, 1929.

The cartridge 11 is formed with an annular groove 12 to receive a catch 13 carried upon a lever 14 having bifurcated arms which extend about the stock 15 of the pistol device. A spring 16 serves to shift the lever yieldably to the position shown in Figure 3, whereby the catch 13 will engage in the groove 12 and retain the cartridge within the barrel 10. By pushing upon the arms 17, the lever may be rocked about an intermediate fulcrum on the stock to withdraw the catch 13 and permit of the ejection of the cartridge 11.

The stock 15 is also provided with the pivotally mounted trigger mechanism 18, whereby to fire the cartridge in a well-understood manner.

In accordance with the invention, an attachment is made to the flash pistol for operating the camera shutter, and this attachment is preferably combined into a unitary construction held to the barrel 10 of the pistol by a split collar 19 having the flanged split ends 20 thereof receiving a bolt or other fastening 21, by which the split collar is clamped tight about the barrel. Lugs 22 are mounted upon the collar and project upwardly therefrom to receive the fulcrum or pin 23 by which the vane 24 is pivoted to the lugs. This vane is preferably of long narrow form projecting beyond and overlying the barrel 10 and muzzle of the pistol, with its outer tip end curved downwardly into substantially the projected axis of the gun barrel, whereby it is placed to receive the muzzle pressure of the flashlight when fired. This vane may be made of thin sheet metal appropriately reinforced as by the lateral flanges 25 and the central webs 26 of triangular or other form.

The lower portions of the webs are pivoted on the fulcrum pin 23, these webs projecting rearwardly of the rear edge of the vane 24. The upper rear portions of the webs 26 have a connecting plate 27 therebetween for receiving the push button 28 of a camera release mechanism, including the flexible shaft 29 and flexible tube 30. Ears 31 project rearwardly from the sides of the plate 27 to correctly center the device with respect to the shutter release mechanism and to confine the sides of the push button 28 in place.

The flexible tube 30 is carried within clamp jaws 32 which are squeezed together by a bolt, thumb screw or other fastening 33. The clamp jaws are preferably made from resilient metal in one piece with the collar 19, a strip 34 extending rearwardly from the central upper portion of the collar 19, from which the clamp jaws are bent upwardly. This strip 34 is preferably arcuate in cross section to conform generally to the contour of the barrel 10. At the forward portion of the clamp jaws, supporting and steadying plates 35 are provided to receive the abutment ring 36 at the end of the flexible tube 30.

The collar 19 has a forward projection 37 for receiving the feet 38 of the webs 26 for limiting the downward movement of the vane, it being understood that the spring mechanism of the shutter release, acting through the push button 28, will tend to hold the vane in the lowered position shown in Figure 2.

In the use of the device, a cartridge having been placed in the muzzle of the gun and secured therein by the cartridge device, the trigger 18 is operated, whereupon the charge is fired, and the flash issues from the muzzle of the gun and supplies the flare and illumination necessary to the taking of the picture. The upper end of the vane 24 is exposed to the muzzle pressure of the flash, so that when the flash is discharged, the vane is rocked backwardly or upwardly, as shown in Figure 3, at the same time operating the push button 28 and the flexible shaft 29 which is coupled to the shutter release of the camera shown in Figure 1. In this way, the operation of the camera shutter with the flash is synchronized. This is desirable for the reason that news photographers and others frequently take pictures of subjects in action, and the duration of the flash is usually of too long a period to permit the stopping of motion when the photograph is taken with an open shutter during the duration of the flash. The duration of the flash is usually in the neighborhood of about 1/25 of a second and they require 1/100 to 1/200 of a second to stop motion. Consequently, means must be provided to snap the shutter during the burning of the flash.

It will be obvious that many changes in the construction, combination and arrangement of parts could be made, which could be used without departing from the spirit of our invention, and we do not mean to limit the invention to such details, except as particularly pointed out in the claims.

Having thus described our invention, what we claim and desire to secure by Letters Patent of the United States is:

1. A photographic flashlight device comprising a flashlight gun having a muzzle through which the flash is projected, and a vane pivotally mounted adjacent the muzzle of the gun and projecting along and beyond such muzzle and having a portion beyond the muzzle adapted to project into the path of the issuing flash at a point remote from the muzzle, and camera shutter release mechanism coupled to said vane.

2. A photographic flashlight device comprising a flash producing device and a muzzle through which the flash is adapted to forcibly issue, a shutter release device held adjacent said muzzle, and a vane mounted to oscillate adjacent said muzzle and positioned in operative relation to the shutter release mechanism, said vane projecting in substantial alignment with the muzzle to one side thereof, and having an outer portion curved into the path of the projected flash at a point remote from the muzzle.

3. A photographic flashlight device comprising a flash pistol, a collar removably mounted thereon, a vane pivoted to the collar and having a part exposed to the muzzle pressure of the pistol at a point remote from the muzzle, and means on said collar for supporting a camera shutter release device in operative relation to the vane.

4. A photographic flashlight device comprising a pistol for producing a flash of light, a collar removably mounted on said pistol, a curved vane disposed along the muzzle of said pistol, reinforcing webs on said vane and having stop means cooperating with said collar, said webs being pivoted on the collar, a plate carried by said webs, clamp jaws also carried by said collar, and a camera shutter release mechanism held in said clamp jaws in operative relation to said plate.

5. A photographic flashlight device comprising a flashlight pistol, a removable collar carried thereby, clamp jaws projecting rearwardly from said collar, steadying plates carried forwardly of said clamp jaws, a camera shutter release mechanism held in said clamp jaws and resting upon said steadying plates, webs pivoted to said collar, a vane carried by said webs and projecting along and beyond the pistol, and a plate carried by said webs in alignment with the camera releasing mechanism for operating the same.

6. In a photographic flash-light pistol device, a vane projecting from the barrel of the pistol and into the path of the flash issuing from the pistol at a point remote from the barrel, said vane being the actuating means to spring a shutter on a camera.

LOUIS L. DRIGGS, Jr.
HENRY B. FABER.